Sept. 4, 1973  MINORU KURODA  3,756,888
METHOD OF MAKING A THREE-DIMENSIONAL APPLIQUE
Filed Nov. 4, 1971  2 Sheets-Sheet 1

INVENTOR
MINORU KURODA
BY
ATTORNEY

United States Patent Office 3,756,888
Patented Sept. 4, 1973

3,756,888
METHOD OF MAKING A THREE-DIMENSIONAL APPLIQUE
Minoru Kuroda, Amakasaki, Japan, assignor to Nishizawa Shoji Co., Ltd., Osaka, Japan, and Pilgrim Industries, Inc., New York, N.Y., fractional part interest to each
Continuation-in-part of application Ser. No. 113,088, Feb. 5, 1971, which is a continuation of appplication Ser. No. 662,962, Aug. 24, 1967, now abandoned. This application Nov. 4, 1971, Ser. No. 195,611
Claims priority, application Japan, Dec. 19, 1966, 41/115,532
Int. Cl. B29c 3/00
U.S. Cl. 156—220
6 Claims

ABSTRACT OF THE DISCLOSURE

A die having raised ridges corresponding to a design to be provided in depressed form on an applique is mounted on one electrode of a high-frequency welding apparatus. Onto the cooperating counterelectrode is placed a sandwich composed of a layer of Teflon located between a layer of silicone and a layer of Mylar with the latter facing the associated counterelectrode. A layer of synthetic plastic foam and a layer of polyvinylchloride are superimposed and placed between the two electrodes. Thereupon the electrodes are moved together and the layer of foam and polyvinylchloride are bonded to one another under pressure and simultaneous application of heat along zones formed by the raised ridges and along which zones the foam collapses. The electrodes are then moved apart and between the sandwich and the layer of foam is inserted another layer of thermoplastic material, whereupon the electrodes are again moved together and the new layer of thermoplastic material is bonded to the first-mentioned layer of thermoplastic material and the layer of foam along the aforementioned zones, but pressure and heat are applied for a briefer period of time and to a lesser extent than before.

CROSS-REFERENCE TO RELATED APPLICATION

The present application is a continuation-in-part of my copending application Ser. No. 113,088, filed on Feb. 5, 1971 under the title "Method and Apparatus for Forming Applique Designs;" that copending application in turn is a streamlined continuation of application Ser. No. 662,962, filed on Aug. 24, 1967, now abandoned.

BACKGROUND OF THE INVENTION

The present invention is concerned with a method of making heat bonds in heat-bondable materials, and in particular with a method of heat-bonding or -welding synthetic plastic material of thermoplastic character. Still more particularly the invention is concerned with a method of making a three-dimensional applique of such materials.

In my aforementioned copending application I have disclosed the making of a three-dimensional applique in which a layer of filler material, preferably but not necessarily a synthetic plastic foam, is sandwiched between a base layer and a top layer. The top layer is usually a synthetic plastic sheet material of thermoplastic character, for instance polyvinylchloride. The base layer may be a material similar to that of the top or cover layer, or it may be of a different material, for instance a fabric of textile character. This sandwich is then placed into a well-known high-frequency welding apparatus one electrode of which is provided with a die having an exposed surface provided with raised ridges which correspond to the design which it is desired to provide on the applique. When the electrodes are then moved relatively to one another so as to contact the sandwich under pressure, the heat and pressure exerted upon the sandwich cause the foam material of the filler layer to melt and the foam to collapse along the raised ridges, thereby bonding the top layer and the base layer to one another in zones corresponding to the regions where contact was made by the raised ridges. Because the foam remains unchanged everywhere else, the resulting structure is three-dimensional, being padded by the foam in the areas surrounded by the bonding zones in which the foam is collapsed and the top and base layers adhere to one another.

As already indicated, not only the top layer but also the base layer may be of a thermoplastic material, such as polyvinylchloride or an analogous material. In such case difficulties have been experienced in separating the completed applique from the remainder of the material surrounding it. It will be appreciated that the layers of the top and base material and of the intermediate material are as a rule larger than the precise dimensions required for the applique which is to be produced, because it would not be practical and economical to have to align the outermost raised ridges with the very outermost boundary zones of these layers prior to the bonding operation. Therefore, the layers are made larger but this of course means that when the applique is completed an annulus of waste material will surround it. This waste material must be removed, and for this purpose the circumferentially complete outermost raised ridge of the die is provided with an edge which during the bonding operation forms a tear-seal along which the material of the annulus is to be separated from the completed applique.

The difficulties which have been experienced in this respect result from the fact that with the use of both a top and a base layer of synthetic plastic material the bonding along this tear edge tends to be such as to make the separation of the waste material difficult if at all possible. It has been found that due to lateral heat radiation out of the bonding zone, the bonding zone width is irregular and in any case wider than is intended for the tear edge, so that some of the material of the annulus of waste material becomes bonded to the applique. This is particularly difficult if, as is frequently the case, the top and intermediate or filler layers are to be bonded to a base layer which is larger in surface area than the top and intermediate layers. In other words, the annulus of waste material which is to be removed is composed only of portions of the top and intermediate layers whereas the base layer is to retain its original size. If, under such circumstances, portions of the waste annulus of the top and intermediate layers become bonded to the base layer along the outer tear seal zone, then they can either be removed only with difficulty, leaving behind an unsightly and aesthetically displeasing residue, or cannot be removed at all for fear of tearing the material of the base layer.

It is, consequently, an object of the present invention to overcome the aforementioned difficulties.

More particularly it is an object of the present invention to provide an improved method of the type under discussion which is not possessed of the aforementioned disadvantages.

Still more particularly it is an object of the present invention to provide an improved method of making a three-dimensional applique of the type outlined above.

In pursuance of these above objects, and of others which will still become apparent hereafter, one feature of the invention resides in such a method which comprises the steps of mounting a die having raised ridges corresponding to a desired applique design, on one of two electrodes of a high-frequency welding apparatus which are movable towards and away from each other. Onto the other electrode there is placed a sandwich composed of a thermally insulating layer which is located adjacent the other electrode, a release layer which is remote from the other electrode, and an electrically insulating layer which is located between the thermally insulating layer and the release layer. Now a first layer of compressible filler material and a second layer of thermoplastic sheet material are superimposed with one another and placed between the die and the sandwich. Thereupon the two electrodes are moved together, heat-bonding the first and second layers to each other along lines corresponding to the raised ridges by compressing them between the electrodes under simultaneous application of heat for a first period of time. The electrodes are then moved apart and a third layer of thermoplastic sheet material is placed between the first layer and the sandwich, whereupon the electrodes are again moved together and the third layer is bonded to the first and second layers by compressing all three layers between the electrodes under a lesser pressure and at a lesser heat and for a briefer second period of time.

It is not entirely understood just why this particular combination of layers in the sandwich placed onto the other electrode overcomes the previously experienced difficulties. The fact is, however, that it does overcome these difficulties and provides a clean bond along the tear edge so that the annulus of waste material can be readily removed without leaving behind any residue and without fear of tearing the base layer. There is no more lateral escape of heat out of the tear edge and, in consequence, the difficulties of the prior art have been overcome.

The thermally insulating layer of the sandwich is preferably made of the material commercially available under the trade name Mylar. On the basis of my investigations I believe that this material acts as a heat insulating barrier insulating the base layer of synthetic thermoplastic material against receiving excess heat from the lower or other electrode, keeping it cooler and permitting the upwardly directed portion of the base layer—that is the portion facing the layer of compressible filler material—to weld without entirely melting to the compressible filler material layer and to the top layer of thermoplastic material. It is, in fact, possible to omit the Mylar layer but I have found that the weld then obtained is not as good as when the Mylar is used. I have also found that I can substitute certain other materials for the Mylar and receive acceptable results, even if not as good as those obtained with the use of Mylar. The most effective substitute material I have found to be ordinary file folder manilla paper.

The electrically insulating layer is preferably of the material available under the trade name Teflon and I believe this acts as an electrical insulation barrier preventing arcing between the two electrodes with a consequent burning of the materials being heat-welded and bonded. Of course, the layer need not be of solid Teflon material, but it could be in form of a layer of Teflon-coated or -impregnated fabric. Also, it is possible to use a different electrically insulating material, for instance Bakelite which is also a trademarked material, but I have achieved best results with Teflon or Teflon-containing materials.

The release layer, finally, is preferably in form of a sheet of silicone material, such as silicone paper. The synthetic plastic material of the base layer, which comes in direct contact with this release layer, does not adhere to silicone under any circumstances. My previous experimentation has shown that contrary to what might be assumed, Teflon is not as effective a release layer as silicone, especially when the base layer is a thermoplastic material such as polyvinylchloride, because this material has a tendency to adhere to Teflon after one or more consecutive heat-bonding operations, a factor which does not occur when silicone is used. I have also found that I can eliminate both the silicone or substitute and the Mylar or substitute, and use only Teflon or its substitute. However, the heat-bond or heat-weld then obtained is not nearly as clean and desirable as when the sandwich is made up of the aforementioned three layers.

It is also necessary that during the first welding operation, in which the intermediate layer and the top layer are bonded together, the pressure exerted be relatively heavy in order to effect compressing of the intermediate layer along the bonding zones and to almost sever the top layer along the outer edge on the outer circumferential ridge of the die which subsequently forms the tear edge. Of course, the precise pressure will vary depending on the types and thicknesses of thermoplastics involved.

The second welding operation involves only a very light pressure, just sufficient to contact the already bonded top layer and intermediate layer with the newly-inserted base layer in a sufficiently firm manner. The pressure must be such as to assure that sufficient contact is made everywhere and that no gap is left which could for instance encourage the formation of an electrical arc. On the other hand it must not be strong enough to cause the outer cutting edge of the die, which forms the tear edge, to cut into the material of the base layer. The application of heat—that is the burst of high-frequency energy supplied during the second welding operation—is very brief, in form of a "touch" weld, just sufficient to bond the upper and intermediate layers to the base layer and to form the tear edge along which the annulus of waste material can then be readily removed, an operation which should take place preferably immediately after the welding is completed.

Again the amount of heat and length of time during which it is applied will vary independent of the types and thicknesses of synthetic thermoplastic materials utilized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
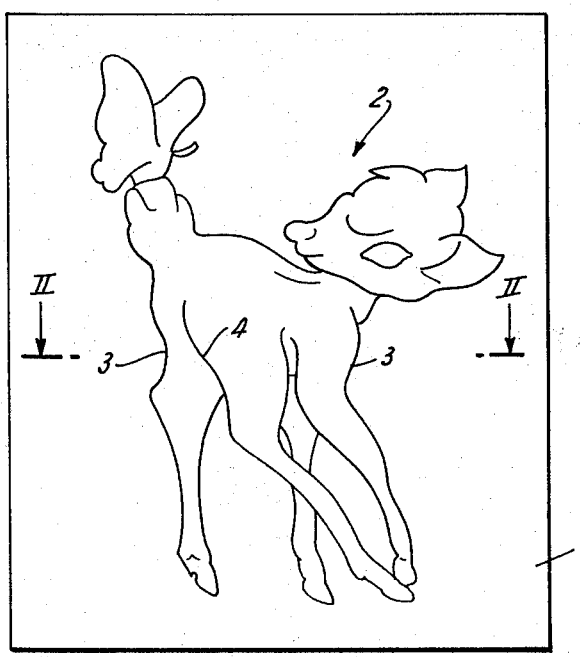
FIG. 1 is a somewhat diagrammatic plan view illustrating an applique made according to the method of the present invention.
Figure 2:
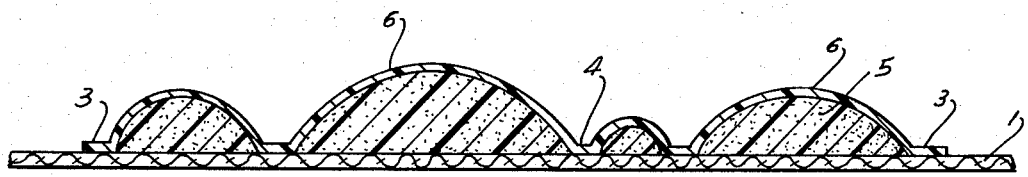
FIG. 2 is a section taken on line II—II of FIG. 1.

Discussing firstly FIGS. 1 and 2 it will be seen that reference numeral 1 identifies a base or support layer which is of thermoplastic synthetic material, for instance polyvinylchloride. Reference numeral 2 identifies an affixed applique in toto, and reference to FIG. 2 will show that on top of the base layer 1 there is a foam intermediate layer 5 and a cover layer 6 of synthetic plastic material, again polyvinylchloride or a similar thermoplastic. Reference numeral 3 designates the outer circumferentially complete bonding line or zone along which the layers 5 and 6 are bonded to the base layer 1, and reference numeral 4 designates similar inner bonding zones or lines.

Figure 3:
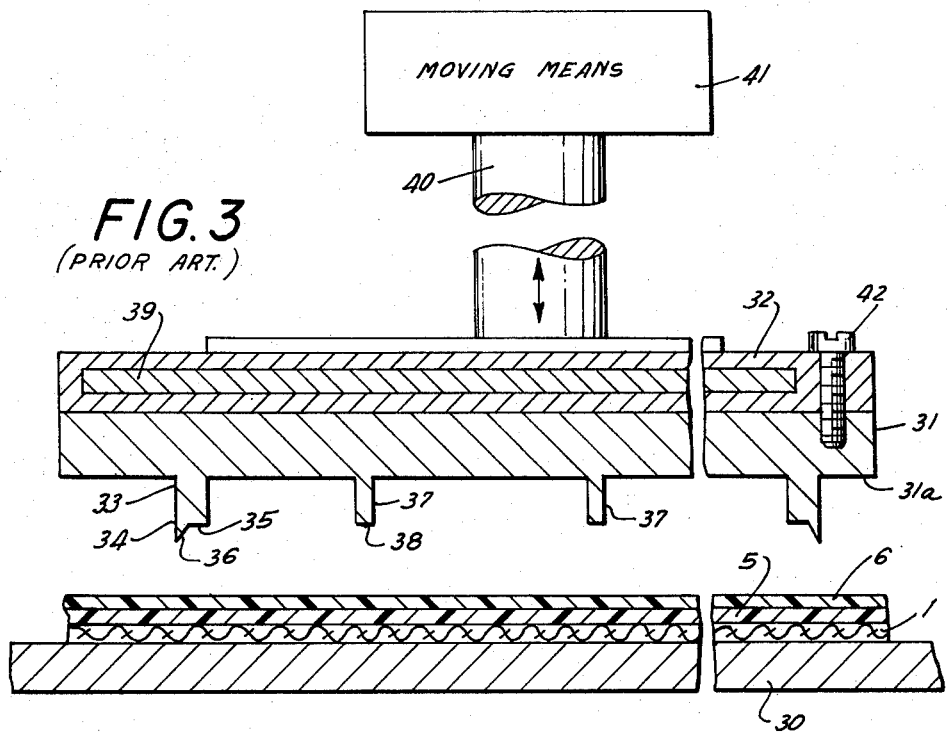
FIG. 3 illustrates an apparatus in somewhat diagrammatic sectional form, showing the manner in which the applique of FIGS. 1 and 2 was made according to the prior art.

This applique is known from my aforementioned copending application, and according to that application it can be produced on an apparatus which is illustrated in FIG. 3. That apparatus utilizes a counterelectrode 30 in a high-frequency welding apparatus which is known per se. Reference numeral 31 designates a platen having an exposed surface 31a facing the electrode 30. The platen, which is carried by a carrier 32, is provided with downwardly extending ribs or projections 33 each of which will, upon contact with the layers 5 and 6, and heating, form the outer circumferentially complete bonding line or zone 3. The rib 33 is provided with a cutting edge 34 which is connected by an inclined surface 36 with the recessed land 35. This cutting edge is sufficient to cut into but not usually all the way through the layers 6 and 5. The ribs 37 form the zones or lines 4 with their lands 38. Reference numeral 39 identifies a heating element known per se for heating this platen 31 and reference numeral 42 is indicative of a screw (only one shown) holding the various components together.

Reference numeral 40 designates a shaft by which the just-described elements are connected with a suitable moving means so as to be moved towards and away from the counterelectrode 30.

The sandwich composed of layers 6, 5 and 1 is placed on the counterelectrode 30, and the moving means 42 moves the platen 31 downwardly against the sandwich to compress it under simultaneous application of heat in order to obtain the bonding zones 3 and 4 in the applique shown in FIGS. 1 and 2. Along the outer edge of the bonding zone 3, the non-illustrated annulus of waste material of the layers 6 and 5 must then be removed.

The difficulties encountered in such removal, outlined above, are overcome by resorting to the present invention which will now be explained with respect to FIG. 4. The apparatus illustrated in FIG. 4 is the same as that in FIG. 3, like reference numerals designating like elements.

Figure 4:
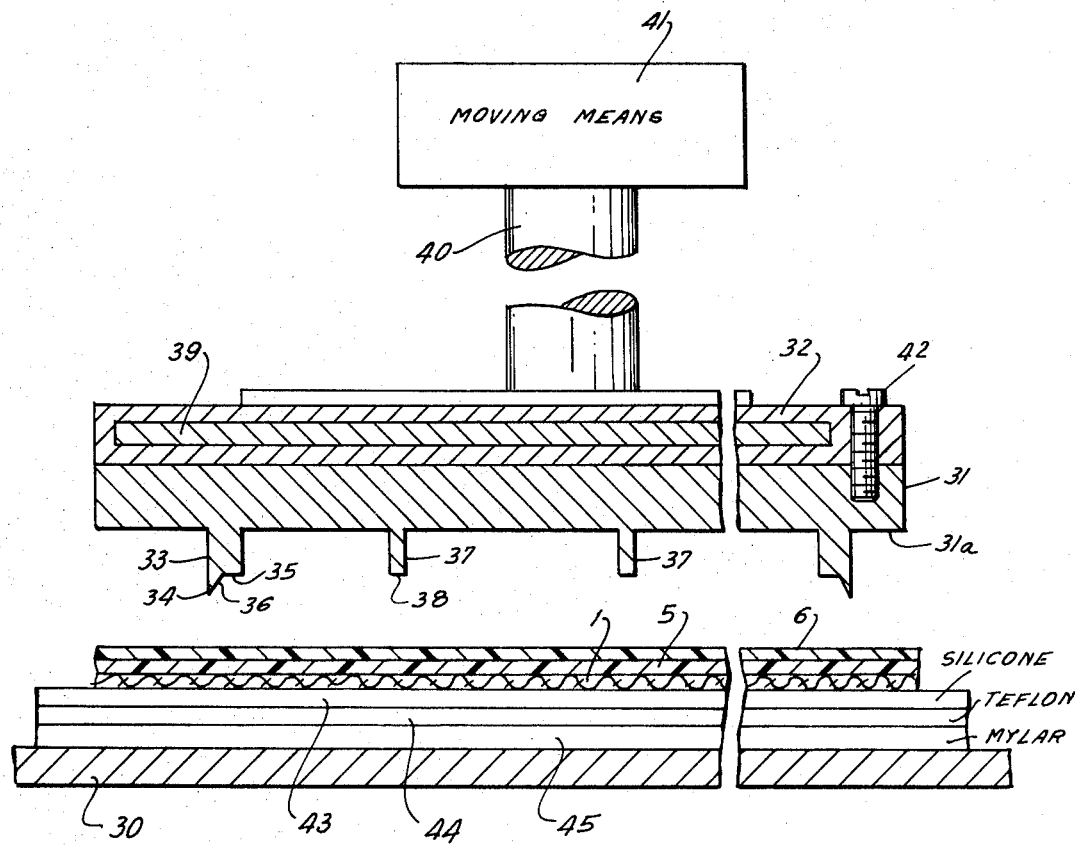
FIG. 4 is a view similar to FIG. 3 but illustrating the present invention.

However, in accordance with the present invention and as shown in FIG. 4, there is placed onto the counterelectrode 30 a sandwich composed of a layer 43 of silicone, a layer 44 of Teflon, and a layer 45 of Mylar, with the latter facing the counterelectrode 30 and the layer 43 of silicone facing the underside of the base layer 1. As indicated earlier, certain other materials may be substituted for the materials set forth above with respect to the layers 43–45.

The layers 5 and 6 are now placed onto the layer 43, and the platen 31 is moved downwardly against the counterelectrode 30 in the manner already outlined, to obtain the desired pressure under simultaneous application of heat. This bonds the layers 5 and 6 to one another along the lines or zones 3 and 4. The platen 31 is now raised, and usually the layers 6 and 5 will simply adhere to it and be raised with it. Now the layer 1 is inserted on top of the layer 43 of the sandwich and the platen lowered again, pressing the layers 5 and 6 against the layer 1 with lesser pressure than before and for a briefer period of time than before. At the same time a lesser burst of high-frequency energy is applied, to provide less heat than before and to bond the layer 1 to the layers 4, 5 and 6. Now the platen 31 is raised again and the annulus of waste material is removed along the tear edge formed along the outer edge of the zone 3 by the cutting edge 34 of the rib 33. None of the problems found in the prior art are encountered when the operation is carried out as set forth above with the use of the sandwich of the layers 43, 44 and 45.

The present invention thus makes it possible, for the first time, to provide a method which overcomes all the disadvantages set forth above with respect to the prior art.

It will be understood that each of the elements described above, or two or more together, may also find a useful application in other types of construction differing from the types described above.

While the invention has been illustrated and described as embodied in a method of making an applique, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of making a three-dimensional applique, comprising the steps of mounting a die having raised ridges corresponding to a desired applique design on one of two electrodes of a high-frequency welding apparatus which are movable towards and away from each other; placing on the other electrode a sandwich composed of a thermally insulating layer adjacent said other electrode, a release layer remote from said other electrode, and an electrically insulating layer between them; placing a first layer of compressible filler material and a second layer of thermoplastic sheet material between said die and said sandwich, and heat-bonding said first and second layers to each other along lines corresponding to said ridges by compressing them between said electrodes under simultaneous application of heat for a first period of time; inserting a third layer of thermoplastic sheet material between said first layer and said sandwich; and bonding said third layer to said first and second layers by compressing them between said electrodes under lesser pressure and at lesser heat for a briefer second period of time.

2. A method as defined in claim 1, wherein said thermally insulating layer is Mylar, said release layer is silicone, and said electrically insulating layer is Teflon.

3. A method as defined in claim 1, wherein said ridges comprise an outer circumferentially complete ridge having an edge which forms an annular tear-seal zone in said third layer; and further comprising the step of separating the material of said first through third layers which is located without said tear-seal zone from the material of the same layers which is located within said tear-seal zone.

4. A method as defined in claim 1, wherein said first layer is a synthetic plastic foam material, and at least said third layer is polyvinylchloride.

5. A method as defined in claim 4, wherein said second layer is also polyvinylchloride.

6. A method as defined in claim 4, wherein the step of heat-bonding said first and second layers comprises effecting collapse of the foam structure of said first layer along the zones compressed by said ridges.

References Cited
UNITED STATES PATENTS

| | | | |
|---|---|---|---|
| 2,710,046 | 6/1955 | Markus et al. | 156—581 |
| 2,427,183 | 9/1947 | Berry et al. | 161—189 |
| 2,811,408 | 10/1957 | Braley | 264—338 |
| 2,729,009 | 1/1956 | Markus et al. | 161—39 |
| 2,729,010 | 1/1956 | Markus et al. | 156—219 |

FOREIGN PATENTS

| | | |
|---|---|---|
| 950,262 | 2/1964 | Great Britain. |
| 937,755 | 9/1963 | Great Britain. |

ALFRED L. LEAVITT, Primary Examiner

F. FRISENDA, Jr., Assistant Examiner

U.S. Cl. X.R.

156—209, 221, 251, 289; 161—189, 206

UNITED STATES PATENT OFFICE
CERTIFICATE OF CORRECTION

Patent No. 3,756,888  Dated Septmeber 4, 1973

Inventor(s) Minoru Kuroda

It is certified that error appears in the above-identified patent and that said Letters Patent are hereby corrected as shown below:

Column 1, lines 4-6, "assignor to Nishizawa Shoji Co., Ltd., Osaka, Japan and Pilgrim Industries, Inc., New York, N.Y." should read -- assignor to Nishizawa Shoji Co., Ltd. Osaka, Japan and one-half to the Dimension Weld International Corporation--.

Signed and sealed this 26th day of February 1974.

(SEAL)
Attest:

EDWARD M. FLETCHER, JR.
Attesting Officer

C. MARSHALL DANN
Commissioner of Patents